(12) United States Patent
Loynes et al.

(10) Patent No.: US 6,700,088 B1
(45) Date of Patent: Mar. 2, 2004

(54) SEALING APPARATUS

(75) Inventors: Simon Geoffrey Loynes, Cosby (GB); Martin Hall, Syston (GB)

(73) Assignee: Amchem Limited (GB)

( * ) Notice: Subject to any disclaimer, the term of this patent is extended or adjusted under 35 U.S.C. 154(b) by 0 days.

(21) Appl. No.: 10/009,378

(22) PCT Filed: May 31, 2000

(86) PCT No.: PCT/GB00/02086

§ 371 (c)(1),
(2), (4) Date: Mar. 5, 2002

(87) PCT Pub. No.: WO00/74886

PCT Pub. Date: Dec. 14, 2000

(30) Foreign Application Priority Data

Jun. 4, 1999 (GB) .............................. 9912970

(51) Int. Cl.$^7$ .............................. B23H 1/00; B23H 7/26
(52) U.S. Cl. .............................. 219/69.15; 219/69.17; 277/620
(58) Field of Search ............... 219/69.14, 69.15, 219/69.2, 69.17; 277/620

(56) References Cited

U.S. PATENT DOCUMENTS

| | | | |
|---|---|---|---|
| 4,469,017 A | 9/1984 | Hanlon | ......... 92/168 |
| 5,019,683 A * | 5/1991 | Abdukarimov et al. | .. 219/69.14 |
| 5,055,650 A * | 10/1991 | Barthes et al. | ......... 219/69.15 |
| 6,211,480 B1 * | 4/2001 | Nagata | ......... 219/69.14 |
| 6,403,910 B1 * | 6/2002 | Stang et al. | ......... 219/69.15 |

FOREIGN PATENT DOCUMENTS

| | | | |
|---|---|---|---|
| DE | 19804371 A1 | 8/1998 | |
| JP | 1-295720 A * | 11/1989 | ........ 219/69.14 |
| JP | 3-60930 A * | 3/1991 | ........ 219/69.14 |

OTHER PUBLICATIONS

Copy of International Search Report.

* cited by examiner

Primary Examiner—Geoffrey S. Evans
(74) Attorney, Agent, or Firm—Young & Basile, P.C.

(57) ABSTRACT

A sealing apparatus for effecting a temporary seal against an elongate object. The object is placed in a chamber (17) and supported between inlet and outlet apertures in the walls of the chamber. A resilient seal (32) is placed at the point where the object passes through one of the apertures. A piston (34) is located on the remote side of the seal being operable to compress the seal towards the relevant aperture thereby deforming the seal laterally into contact with the object to seal the periphery of the object. When the piston is released, the seal reverts to its relaxed condition thereby enabling the object to be moved between the two apertures.

10 Claims, 4 Drawing Sheets

SEALING APPARATUS

Figure 1:
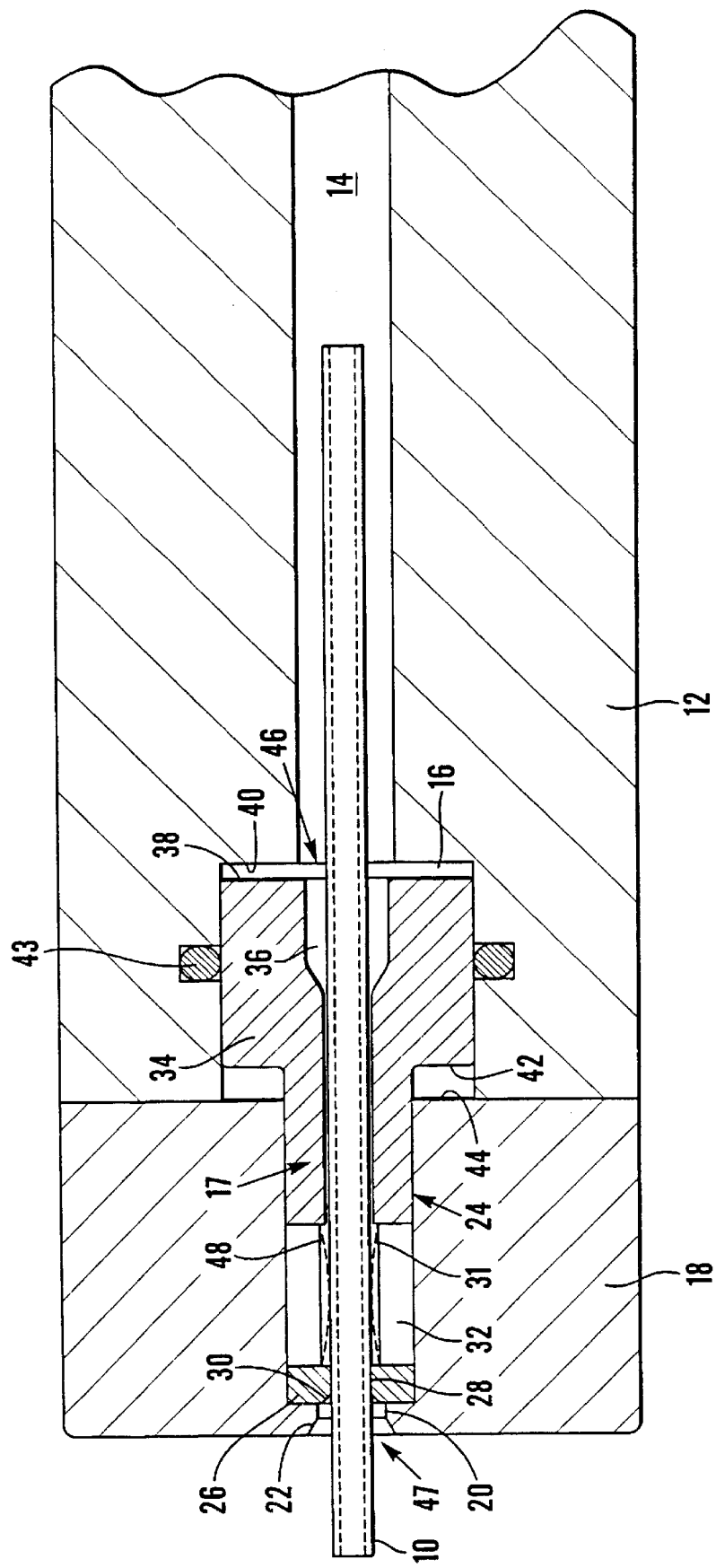

The present invention relates to sealing apparatus particularly, but not exclusively, to sealing apparatus for sealing one or more electrodes in a cartridge of an electrical discharge machining (EDM) apparatus.

EDM is used widely to machine perforations or cavities in electrically conductive metals. The process is used, for example, in the production of bores and features, both cylindrical and otherwise shaped, in gas turbine engine components and in turbine blades and veins especially. In this application the diameter of the bores is small, typically ranging from 0.25 mm to over 1.0 mm and there is a high aspect ratio, i.e. the ratio of bore depth to diameter. A typical aspect ratio is 20.

It has been found advantageous when creating high aspect holes (i.e. aspect ratios greater than say 4) to utilise tubular electrodes and to flow dielectric fluid, normally deionised water, through the tubular electrodes towards the workpiece being machined. The dielectric fluid assists flushing eroded debris from a bore being machined whilst at the same time cooling the electrode. This arrangement enables significantly faster drilling whilst at the same time achieving the required metallurgical criteria. The dielectric fluid utilised is under sufficient pressure to allow fluid to pass through the length of the tubular electrode towards the workpiece. This requirement involves providing fluid under a pressure of typically 1000 psi, that is approximately 6900 kN/m$^2$, at the inner end of the electrode or electrodes.

It has been found that as well as flowing through each electrode, fluid tends also to discharge around the outer surfaces of the electrodes and one objective of the invention is to reduce or eliminate this discharge.

In existing electrode cartridges a cover plate is bolted or otherwise secured to the base of the cartridge which includes a plurality of grooves each of which receives a respective electrode and which guide the electrodes to produce the desired arrangement of holes. Currently, the replenishment of the electrodes is performed manually. By replenishment is meant resetting the electrode tips in their correct positions relative to the workpiece by drawing further lengths of electrode from the electrode cartridge. A further objective of the invention is to facilitate the automatic replenishment of electrodes.

According to the present invention there is provided a sealing apparatus for effecting a temporary seal against an object comprising a chamber with an elongate object passing from an inlet aperture to an outlet aperture in the chamber, characterised by a resilient seal disposed within the chamber adjacent one of said apertures, and a piston for compressing the seal, which is located between the respective apertures and adjacent the seal, the piston being movable between a non-sealing position in which the seal is relaxed and a sealing position in which the piston engages and compresses the seal thereby creating lateral deforming movement of the seal material to bring seal material into sealing contact with the object to be sealed and means for displacing the piston between the non-sealing and sealing positions.

Preferably, the resilient seal is made of generally homogenous material.

The piston may include one or more passages for receiving respective elongate objects, so that the object or objects against which a temporary seal is to be made can extend straight through the sealing apparatus.

The piston may be stepped, the step being engageable against a shoulder of the enclosure to limit axial movement of the piston and hence the amount by which the seal material is compressed.

The means for displacing the piston from its non-sealing to its sealing position may be fluid operated, for example, by the use of a high pressure fluid, typically water, acting on the piston head. Alternatively, the piston may be displaced electrically, for example, by means of a solenoid. Alternatively again, the piston may be displaced pneumatically.

The object against which a temporary seal is to be made may be an electrode or a plurality of electrodes of an EDM apparatus. When a plurality of electrodes are employed, they may be arranged in spaced relationship.

When the sealing apparatus is applied to EDM, both the seal material and the piston are made from an electrically insulating material since, in use, an electrical potential is applied to the or each electrode. In this instance, the piston is preferably of polyurethane or acetal. Further in this application, a support may be interposed between the relevant aperture of the chamber and the seal. A bore or bores in the support is of less diameter than that of the or each aperture in the seal in its relaxed condition, i.e. when the piston is in a non-sealing position, so that, in use, the support serves to prevent seal material being extruded out of the chamber through the annular space between the object and the aperture in the chamber.

Part of the enclosure may be provided as a chamber in a block containing the electrode or electrodes and part in a pressure cap rigidly secured to the block. The depth of the part of the chamber within the block may be somewhat greater than that of the part within the cap so that a shoulder is provided at the junction between the two. This shoulder may serve as a stop to limit movement of the piston and so limit the amount by which the seal material is compressed.

An 'O' ring seal may be provided in that part of the cylindrical wall of the chamber in the block to serve as a fluid seal when fluid is used to displace the piston. The piston may be displaced from its non-sealing position by the application of high pressure fluid, for example, water under a pressure of 1000 psi, that is approximately 6900 kN/m$^2$.

Also according to the present invention there is provided a method of effecting a temporary seal against an object which comprises placing the object adjacent a resilient seal, moving a piston located for sliding movement against the seal, the piston being moveable between a non-sealing position in which the piston lies displaced from the seal and a sealing position in which the piston engages and compresses the seal thereby creating deforming movement of seal material to bring seal material into sealing contact with the object.

Figure 2:
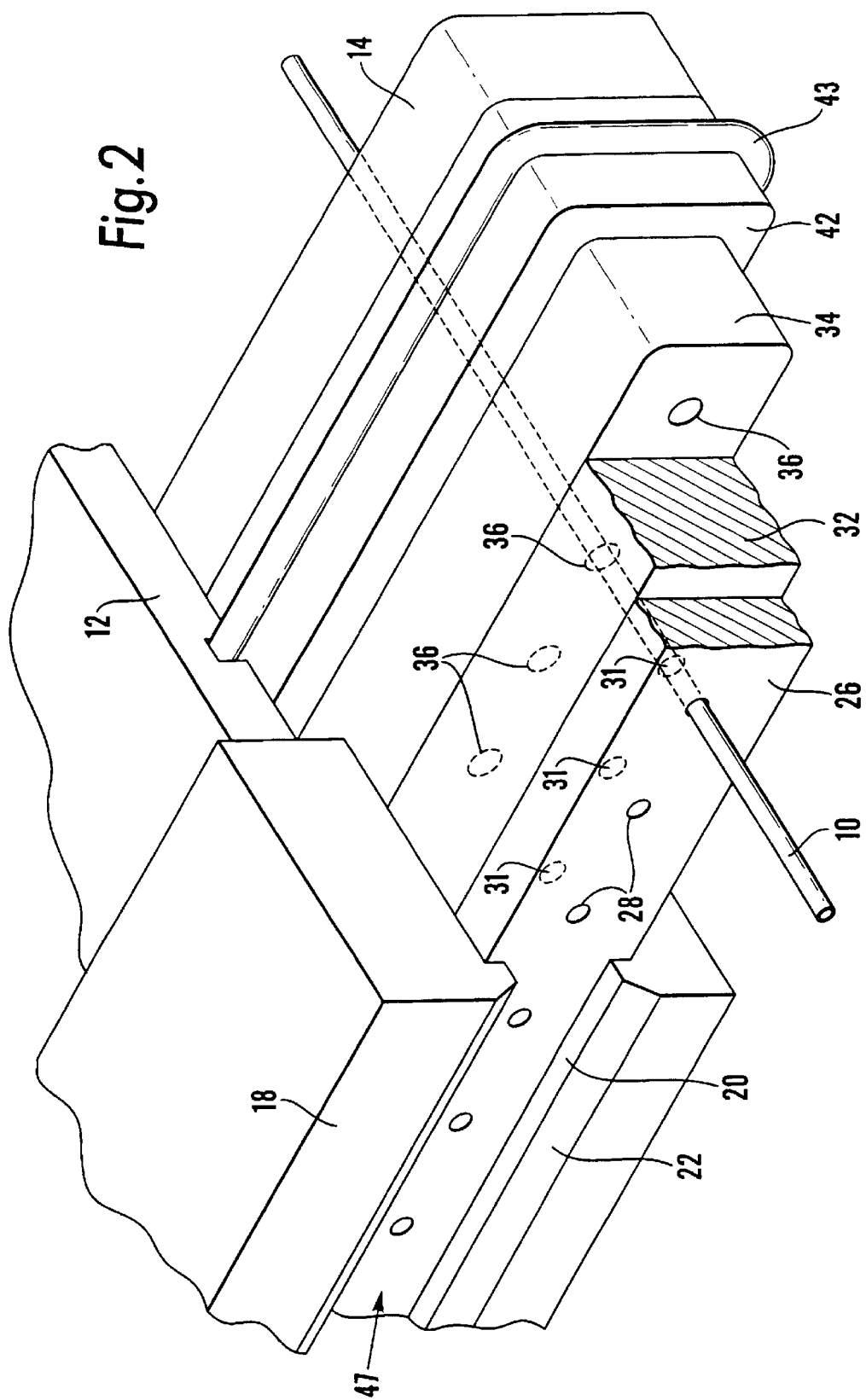
Figure 3:
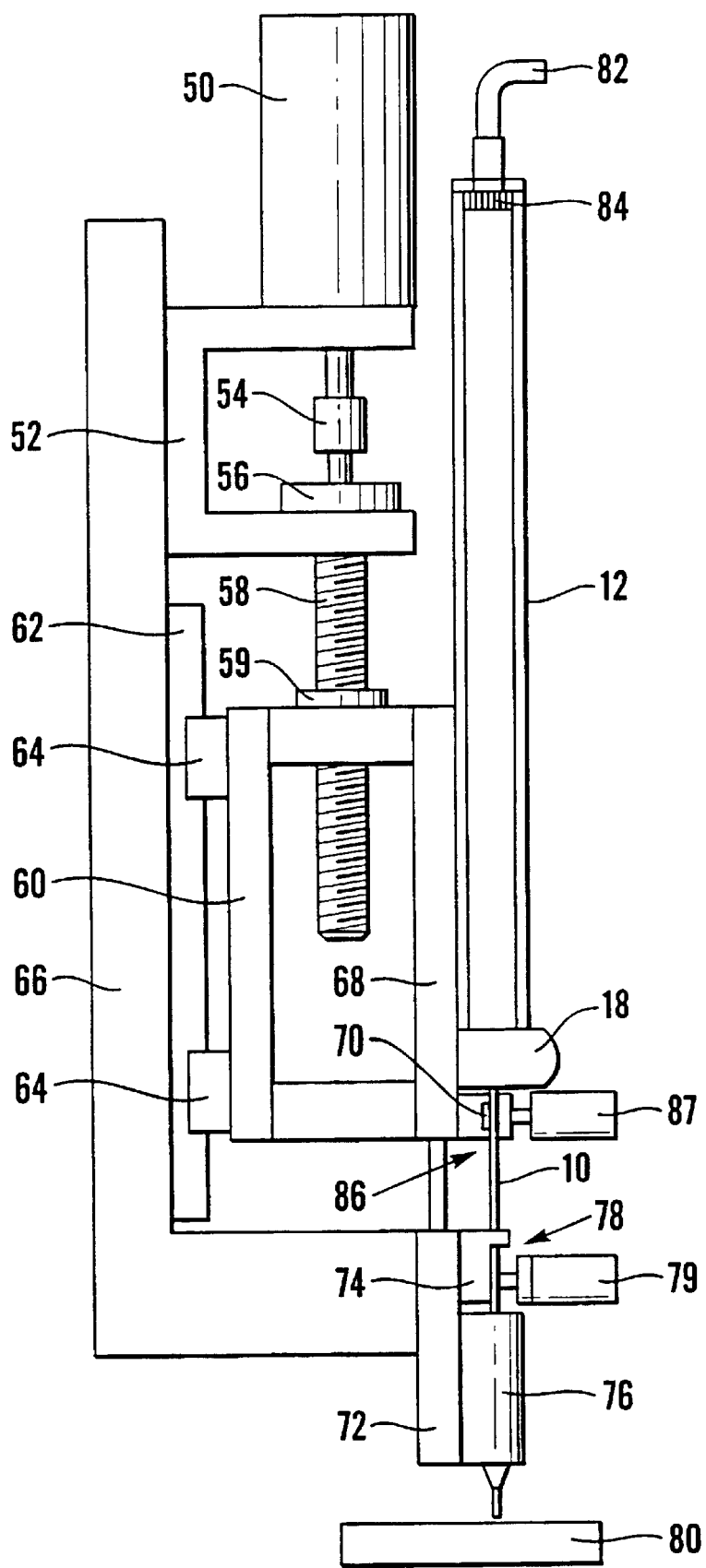
Figure 4:
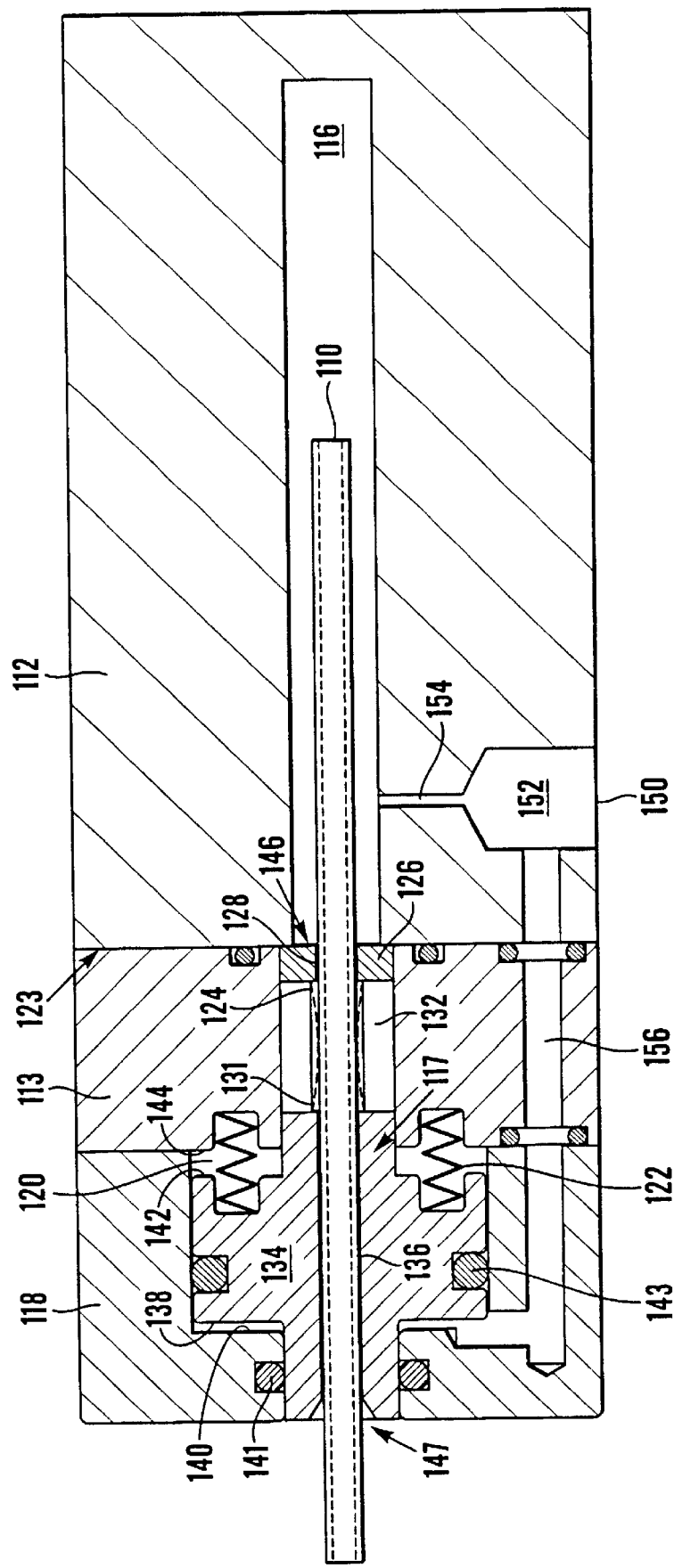

The invention will now be described further by way of example with reference to the accompanying drawings in which:

FIG. 1 is a longitudinal sectional view through a scaling apparatus according to a first embodiment of the invention, FIG. 2 is a partly broken away perspective view of the apparatus illustrated by FIG. 1, FIG. 3 is a partly broken away vertical sectional view of an EDM cartridge and nose guide incorporating the sealing apparatus of the invention, mounted in an EDM slide assembly adjacent a workpiece, and FIG. 4 is a longitudinal sectional view through a sealing apparatus according to a second embodiment of the invention.

The sealing apparatus illustrated in the drawings forms part of an electrode cartridge assembly which is used for holding and feeding electrodes towards a workpiece to be machined using EDM. In the drawings, the electrodes are of tubular form and are made from brass, copper, tungsten or various tungsten compounds or alloys. The choice of electrode material in any instance depends upon cost, hole size, hole depth, process speed, metallurgy and so on. Dielectric fluid, for example, deionised water, is caused to pass along the length of the or each electrode from right to left as viewed in FIGS. 1,2 and 4, towards a workpiece to be machined (not shown in FIGS. 1,2 and 4).

In the first embodiment of the invention, a plurality of hollow electrodes 10 are arranged in spaced apart relationship as can best be seen from FIG. 2. A storage block consisting of an aluminium casing 12 mounts the right-hand side, as viewed, ends of the electrodes in a grooved plastics electrode guide 14. The guide ensures that the electrodes are supported and maintained substantially in the required spacing so that they do not bow or otherwise deform. Referring also to FIG. 1, a chamber 16 is formed in an end face of the storage block 12 and a slotted cap 18 made of stainless steel is rigidly secured in fixed relationship relative to the block 12. The slotted cap 18 forms a further chamber 24 which, with the chamber 16 forms a composite chamber 17 with stepped top and bottom walls. It will be noted that the depth of the chamber 16 is slightly greater than that of the chamber 24 and that a shoulder 44 is formed at the junction between the block 12 and cap 18 which is to serve as a piston limiting stop.

The composite chamber 17 has an inlet aperture, shown generally at 46, at the right-hand side, as viewed, end of the chamber 16. An outlet aperture, shown generally at 47, of the composite chamber 17 is provided in the nose of the cap 18. The inlet and outlet apertures 46, 47 enable an elongate object, in this case an electrode 10, to extend through the composite chamber 17.

The outlet aperture 47 includes two axial portions, the first of which 20 provides for a large air gap around the electrodes, the purpose of which is to avoid tracking between the electrode and nose when the apparatus is in use. The second portion 22 forms a tapered outlet to resist tracking between the electrodes and the cap 18.

A strip like seal support 26 of an insulating material with good dielectric performance such as plastics or ceramic material is placed in the chamber 24 adjacent the nose portion. The support includes a plurality of apertures 28, each of which receives an electrode 10 as a clearance fit. The outer edges of the support 26 are chamfered as at 30 to assist loading of electrodes 10.

A resilient seal 32 consisting essentially of either rubber or polyurethane is placed in abutting relationship with the support 26, and also includes a plurality of apertures 31, each of which receives an electrode 10. The seal material is homogenous to enable it to transmit pressure uniformly. The seal material must also be an insulator, since it is to come into contact with the electrodes. It is important that the seal material is resilient to enable it to return to its original shape and form when in a released condition, i.e. when the piston occupies a non-sealing position.

A stepped piston 34 is mounted for movement within the composite chamber 17. The piston includes a plurality of bores 36, each of which accommodates an electrode. The piston is movable between a non-sealing position in which the piston head 38 engages or lies adjacent a shoulder 40 within the storage block 12 and in which the seal is in a relaxed condition, and a sealing position in which the step 42 of the piston engages the shoulder 44 at the junction between the block 12 and the cap 18. An O-ring seal 43 is provided between the wall of the chamber 16 and the piston to prevent the passage of dielectric fluid around the outside of the piston.

Alternatively, the second limiting position of the piston can be formed by two or more pins (not shown) passing through the top and bottom of the storage block 12 or the cap 18.

In use, dielectric fluid, normally deionised water under a pressure of 1000 psi (approximately 6900 kN/m$^2$) is fed along a longitudinal passage in the storage block 12. The fluid then passes within and along the length of each tubular electrode, in known manner, towards the workpiece. The fluid also comes into contact with the piston head 38 which displaces the piston in the direction from the inlet aperture 46 towards the outlet aperture 47, that is towards the left, as viewed, until the step 42 engages the shoulder 44. In this position, the seal 32 is axially compressed and since the boundaries of the seal are defined on three sides, the seal deflects laterally, i.e. inwardly as shown in broken line 48 and into firm engaging contact with the electrodes 10. Hence, fluid which may otherwise have passed through the seal apparatus along the outside of the electrode 10 is no longer able to do so.

It should be noted that the apertures 30 in the support 26 are of less diameter than the apertures 31 in the seal 32 in order to prevent seal material being extruded out of or into the enclosure through the annular space between the or each electrode and support.

The second embodiment of the invention will now be described with reference to FIG. 4. Basically the same reference numerals have been used to designate parts in common with the first embodiment, save that 100 has been added to the FIG. 1 numbers since the parts are not identical.

A storage block is formed in two parts 112, 113 which are rigidly secured together. The part 112 of the storage block is made of aluminium and houses a chamber 116 which mounts the stored ends of the electrodes 110 in a grooved plastics electrode guide (not shown). As in the first embodiment, the guide ensures that the electrodes are supported and maintained substantially in the required spacing so that they do not bow or otherwise deform.

The electrodes 110 pass through a chamber 124 formed in the part 113, which chamber is aligned with the chamber 116 of the part 112. A cap 118 is rigidly secured in fixed relationship to the left hand side of the part 113, as viewed, the cap also having a chamber 120 through which the electrodes extend. Both the cap 118 and the part 113 are made of stainless steel. The cap 118, and the parts 112,113 may be positionally aligned by means of dowels (not shown), and are fixed together. Thus, there is provided a composite chamber 117 consisting of the two chambers 120 and 124. The inlet to the composite chamber 117, is shown generally at 146 to the right-hand side, as viewed, end of the chamber 124, and the outlet to the composite chamber 117 is shown generally at 147 to the left-hand side, as viewed, end of the chamber 120.

A port 150 is provided in one side of the storage block part 112, for connection to the high pressure dielectric fluid supply. The port 150 opens into a chamber 152, which is connected to the chamber 116 through a channel 154. A restriction may be provided in the channel to reduce the pressure of the dielectric fluid between the chamber 152 and the chamber 116. The diameter of the channel 154 is selected with a view to the actual pressure required, in use, for dielectric fluid in the chamber 116.

The left-hand end, as viewed, of the chamber 120 in the cap 118 is also connected to the chamber 152, but by means of an unrestricted channel 156 which passes through the parts 112, 113 and the cap 118. The purpose of this channel is discussed further below.

A seal support 126 of an insulating material is provided in the chamber 124 and locates against the end face 123 of a shoulder formed at the junction between the chamber 116 and the chamber 124. Clearance apertures 128 are provided in the support 126 for respective electrodes 110. A resilient seal 132 of either rubber or polyurethane is placed in the chamber 124 in abutting relationship with the support 126, the seal being apertured at 131 for receiving the electrodes 110. As in the first embodiment described, the seal material is homogenous, resilient and an insulator.

A stepped piston 134 is mounted for movement within the composite chamber 117. The piston includes a plurality of bores 136, each of which accommodates an electrode. The piston is movable between a non-sealing position in which the piston head 138 engages or lies adjacent a shoulder 140 within the cap 118, and a sealing position in which the step 142 of the piston engages a shoulder 144 at the junction between the part 113 and the cap 118. Springs 122 shown in dotted outline are provided which locate in and extend between recesses in the piston step 142 and the shoulder 144. The springs bias the piston towards the non-sealing position i.e. to the left as viewed. A pair of 'O' ring seals 141 and 143 seal between the wall of the chamber 120 and the piston 134 at positions on either side of the piston head 138.

In use, dielectric fluid, normally de-ionised water under a pressure of typically 1000 psi, that is approximately 6900 kN/m$^2$, is fed into the chamber 152 through the port 150. The flow of fluid from the chamber 152 divides into the restricted channel 154 and into the unrestricted channel 156. The fluid emerging from the restricted channel 154 enters the chamber 116 at a reduced pressure of typically between 200 and 1000 psi, that is between approximately 1380 kN/m$^2$ and 6900 kN/m$^2$ depending on the amount of restriction, if any, in the channel 154. This fluid then passes within and along the length of each tubular electrode 110 in known manner.

The fluid from the unrestricted channel 156 enters the chamber 120 of the cap 118 and comes into contact with the piston head 138. The fluid pressure displaces the piston against the action of the springs 122 in the direction from the outlet aperture 147 towards the inlet aperture 146, that is towards the right, as viewed, until the step 142 engages the shoulder 144. In this position, the seal 132 is axially compressed in exactly the same manner as described in relation to the first embodiment. The seal therefore firmly engages the electrodes 110 and the sides of the chamber 124 and forms a seal therebetween. The 'O' ring seal 141 prevents dielectric fluid from passing out of the chamber 120 towards the workpiece. The seal 143 serves as a traditional piston ring.

In both of the embodiments described a single source of high pressure dielectric fluid displaces the piston 34, 134 to the sealing position and supplies the fluid to the electrodes 10, 110. However the second embodiment has the advantage that the high pressure of the fluid can be applied to the piston for effecting the seal, but that this high pressure is reduced, if required, to the electrodes, and thereby the flow rate of fluid through the electrodes onto the workpiece is reduced. In this way, if low flow rates through the electrodes are required, then there is still sufficient pressure at the piston head 138 to effect the seal.

Referring now to FIG. 3, the sealing apparatus illustrated in FIGS. 1,2 and 4 is located on the right of the figure, as viewed, and the same reference numerals have been used to designate common parts with FIGS. 1 and 2.

An EDM slide assembly 66 is generally L-shaped with the vertical limb of the 'L' supporting a U-shaped mounting bracket 52 and a pair of linear bearing rails 62 (only one of which can be seen). The upper arm of the mounting bracket 52 supports an EDM servo motor 50 and the lower arm supports a bearing 56 which carries a ball screw 58. The motor 50 is coupled to the ball screw 58 by a motor coupling 54.

An EDM servo axis carriage 60 is slidably mounted on the rails 62 by two carriages 64. A ball screw nut 59 is fitted to the servo axis carriage 60 and is driven by the ball screw 58 to enable the carriage 60 to be displaced vertically as may be required by rotation of the ball screw in known manner.

The sealing apparatus of FIGS. 1 and 2 or 4 is mounted to the servo axis carriage 60 by way of a back plate 68. Hence, the whole of the sealing apparatus can be made to move vertically relative to the EDM slide assembly 66. The high pressure water supply is fed into the storage block 12 through a flexible hose 82, which does not inhibit the movement of the sealing apparatus. A filter 84 is provided at the end of the hose 82.

The electrodes 10 extending downwardly from the seal assembly are supported in a nose guide 76 to lie adjacent the surface of a workpiece 80. The nose guide 76 is fixed to the horizontal limb of the slide assembly 66 by means of a back plate 72.

A first electrode clamp (the EDM clamp) assembly 86 is mounted on the back plate 68 and located adjacent the pressure cap 18. The assembly 86 consists of a clamp block 70, by way of which electrical power can be applied to the electrodes, and a pneumatically operated clamp 87 for clamping the electrodes in a manner to be described.

A second electrode clamp assembly (the replenish clamp) is designated 78 and is mounted on the back plate 72 and is located adjacent the nose guide 76. The assembly 78 consists of a clamp block 74 and a pneumatically operated clamp 79 for clamping the electrodes in a manner to be described.

In use, the EDM slide assembly 66 is moved to position the nose guide 76 close to the workpiece 80.

The sequence of events for setting or replenishing the electrode tips at correct positions relative to the workpiece is as follows:

(a) the water pressure is removed by closing a solenoid valve (not shown) so that the piston 34 is in its non-sealing position and the seal 32 relaxes, (b) the replenish clamp 79 is actuated to clamp the electrodes and the EDM clamp 87 deactuated to release the electrodes, (c) the EDM servo axis carriage 60 is raised by the motor 50, thus drawing further parts of the electrodes from the sealing apparatus, (d) the EDM clamp 87 is actuated and the replenish clamp 79 deactuated, (e) the servo axis carriage 60 is lowered until the electrode tips are sensed to contact the surface of the workpiece 80, (f) the replenish clamp 79 is actuated and the EDM clamp 87 deactuated, (g) the servo slide 60 is raised by the motor 50 thus drawing further parts of the electrodes from the sealing apparatus as in step (c).

The above steps complete the sequence required to set the electrode tips.

The sequence of events to perform a drilling operation are as follows:

(a) the EDM clamp 87 is actuated and the replenish clamp 79, deactuated, (b) high water pressure is applied to the storage block 12 by opening a solenoid valve (not shown) so that the piston 34 moves to its sealing position and the seal 32 deforms to close the aperture around each electrode, (c) EDM power is turned on in known manner and the EDM proceeds again in known manner to drill the workpiece as desired.

It will be appreciated that whereas the invention has been illustrated and described with respect to EDM apparatus, the invention is not restricted to EDM apparatus and can be used where a temporary or releasable seal is required. Further, the object against which the seal is required does not necessarily need to be of tubular form.

Whereas in the illustrated embodiments a plurality of electrodes have been employed, the invention is not intended to be limited in this respect since, in certain instances, a single electrode is utilised.

Whereas in the described embodiments of the invention the seals 32 (FIG. 1) and 132 (FIG. 4) include a plurality of bores through which respective electrodes pass, it is envisaged that the seal may take the form of two pads, one placed below the electrodes 10, 110 and one placed above the electrodes. In this case, the piston compresses both pads to present seal material in the inter electrode gaps thus enabling seal material to seal the periphery of each individual electrode.

What is claimed is:

1. A sealing apparatus for effecting a temporary seal against an electrode in a cartridge of an electrical discharge machining (EDM) apparatus comprising:
    a chamber, with a hollow electrode passing from an inlet aperture to an outlet aperture in the chamber, a resilient seal disposed within the chamber adjacent one of said apertures and a piston for compressing the seal, which is located between the respective apertures and adjacent the seal, both the piston and the seal being made from an electrically insulating material, the piston being movable between a non-sealing position in which the seal is relaxed and a sealing position in which the piston engages and compresses the seal thereby creating lateral deforming movement of the seal material to bring seal material into sealing contact with the electrode, wherein a single source of high pressure dielectric fluid is provided for displacing the piston between the non-sealing and sealing positions, and supplying high pressure dielectric fluid to pass along the length of the hollow electrode.

2. A sealing apparatus according to claim 1, characterised in that the seal is made of substantially homogenous material.

3. A sealing apparatus as claimed in claim 1 characterised in that a single seal is provided which includes a plurality of bores each of which can receive an elongate object for sealing.

4. A sealing apparatus according to claim 1 characterised in that means are provided for limiting forward movement of the piston and hence the amount by which the seal material is compressed.

5. A sealing apparatus according to claim 1, characterised in that the means for displacing the piston from its non-sealing to its sealing position is a high pressure fluid which, in use, acts on the piston head.

6. A sealing apparatus for effecting a temporary seal against an electrode in a cartridge of an electrical discharge machining (EDM) apparatus comprising:
    a chamber, with a hollow electrode passing from an inlet aperture to an outlet aperture in the chamber, a resilient seal disposed within the chamber adjacent one of said apertures and a piston for compressing the seal, which is located between the respective apertures and adjacent the seal, both the piston and the seal being made from an electrically insulating material, the piston being movable between a non-sealing position in which the seal is relaxed and a sealing position in which the piston engages and compresses the seal hereby creating lateral deforming movement of the seal material to bring seal material into sealing contact with the electrode, wherein a single source of high pressure dielectric fluid is provided for displacing the piston between the non-sealing and sealing positions, and supplying high pressure dielectric fluid to pass along the length of the hollow electrode and wherein means are provided for limiting forward movement of the piston and hence the amount by which the seal material is compressed, the piston is stepped and is engageable against a shoulder form in the enclosure forming the chamber.

7. A sealing apparatus for effecting a temporary seal against an electrode in a cartridge of an electrical discharge machining (EDM) apparatus comprising a chamber, with a hollow electrode passing from an inlet aperture to an outlet aperture in the chamber, a resilient seal disposed within the chamber adjacent one of said apertures and a piston for compressing the seal, which is located between the respective apertures and adjacent the seal, both the piston and the seal being made from an electrically insulating material, the piston being movable between a non-sealing position in which the seal is relaxed and a sealing position in which the piston engages and compresses the seal thereby creating lateral deforming movement of the seal material to to bring seal material into sealing contact with the electrode, wherein a single source of high pressure dielectric fluid is provided for displacing the piston between the non-sealing and sealing positions, and supplying high pressure dielectric fluid to pass along the length of the hollow electrode and wherein a single seal is provided which includes a plurality of bores each of which can receive an elongate object for sealing the piston is made from polyurethane or acetal.

8. A sealing apparatus according to claim 7, characterised in that a seal support is interposed between the relevant end wall of the chamber and the seal, a bore or bores in the support being of less diameter than that of at least one of the apertures in the seal when the seal is in its relaxed condition to provide a clearance fit for the electrode, in use, the seal support serving to prevent seal material being extruded out of the chamber through the space between the electrode and the relevant aperture in the chamber.

9. A sealing apparatus according to claim 8, characterised in that an 'O' ring seal is provided in that part of the cylinder wall of the chamber to serve as a fluid seal between the piston and the chamber when fluid is used to displace the piston.

10. A method of effecting a temporary seal against a hollow electrode in a cartridge of an electrical discharge machining (EDM) apparatus which comprises placing the electrode adjacent a resilient seal, moving a piston located for sliding movement against the seal, the piston being moveable between a non-sealing position in which the piston lies displaced from the seal and a sealing position in which the piston engages and compresses the seal thereby creating deforming movement of seal material to bring seal material into sealing contact with the electrode, both the piston and the seal being made from an electrically insulating material, characterised in that a single source of high pressure dielectric fluid displaces the piston between the non-sealing and sealing positions, and supplies high pressure dielectric fluid to pass along the length of the hollow electrode.

* * * * *